US012789918B2

(12) United States Patent
Bechtel et al.

(10) Patent No.: US 12,789,918 B2
(45) Date of Patent: Nov. 10, 2026

(54) INTERCHANGEABLE VEHICLE BODY INTERFACE

(71) Applicant: FCA US LLC, Auburn Hills, MI (US)

(72) Inventors: Travis D Bechtel, Auburn Hills, MI (US); Mark E Stout, II, Auburn Hills, MI (US); Fabrizio Urbinati, Turin (IT); Giovanni Luigi Gabiati, Turin (IT)

(73) Assignee: FCA US LLC, Auburn Hills, MI (US)

( * ) Notice: Subject to any disclaimer, the term of this patent is extended or adjusted under 35 U.S.C. 154(b) by 163 days.

(21) Appl. No.: 18/950,597

(22) Filed: Nov. 18, 2024

(65) Prior Publication Data

US 2026/0138681 A1 May 21, 2026

(51) Int. Cl.
*B62D 27/06* (2006.01)
*B60R 13/06* (2006.01)

(52) U.S. Cl.
CPC .............. *B62D 27/06* (2013.01); *B60R 13/06* (2013.01)

(58) Field of Classification Search
CPC ...... B62D 27/06; B62D 27/065; B62D 33/06; B60R 13/06
See application file for complete search history.

(56) References Cited

U.S. PATENT DOCUMENTS 4,842,326 A * 6/1989 DiVito .................. B60P 3/42 296/10
5,033,567 A * 7/1991 Washburn ............. B60P 3/42 296/190.08
5,829,946 A * 11/1998 McNeilus ............. B60P 1/34 410/80
5,934,742 A * 8/1999 Fenton ................ B60P 7/0815 296/191
6,178,612 B1 * 1/2001 Gernstein ............. B62D 33/06 29/401.1
6,719,361 B1 * 4/2004 Adams ............... B62D 33/0612 296/190.01
9,227,675 B1 * 1/2016 Elquest ................ B60P 1/64
10,029,603 B2 * 7/2018 Stocks ................ B62D 63/025
10,479,427 B2 11/2019 Scaringe et al.
10,604,194 B2 3/2020 Mar
11,331,989 B2 * 5/2022 Lutzka ................. B60J 7/141
11,478,882 B2 10/2022 Lee et al.
2011/0291444 A1 * 12/2011 Ische .................. B60P 3/42 296/193.04
2021/0256472 A1 8/2021 Javidan et al.

FOREIGN PATENT DOCUMENTS

CN 211166470 U 8/2020

* cited by examiner

*Primary Examiner* — Yanick A Akaragwe
(74) *Attorney, Agent, or Firm* — Jeremy J. Klobucar

(57) ABSTRACT

An interchangeable body interface has a body interface has a first sealing zone with a channel to receive a first seal. A cab interface has a second sealing zone with a channel to receive a second seal. A drain zone is contained between the first and second seals. The drain zone has a cavity to remove liquid forced past a first seal zone and trapped by a second seal zone. A plurality of compensating fastener coupling the body and cab interfaces together. The compensating fasteners setting a nominal gap between the body and cab interfaces to receive the seals.

14 Claims, 3 Drawing Sheets

INTERCHANGEABLE VEHICLE BODY INTERFACE

FIELD

The present disclosure relates to vehicles and, more particularly, to an interchangeable body interface.

BACKGROUND

This section provides background information related to the present disclosure which is not necessarily prior art.

Business owners often change the mission of their commercial vehicles, such as trucks and vans, as their business grows and the vehicles age. As these vehicles can operate reliably for 15 years or more, an owner may seek the benefit of deploying the vehicle in two more passenger and cargo configurations over its useful lifetime. Thus, owners that want to change the mission of their vehicle are concurrently constrained by initial purchase configurations. In a case of commercial vans, they are typically only two choices of bodies from the factory, a cab with cutaway chassis cab or a continuous van body that is factory equipped with an initial choice of seating, side and rear doors and window configurations.

Cutaway chassis vehicles currently allow for the addition of the service body of the owner's choosing but are not easily converted to integrated van body for passengers. Conversely, the integrated bodies are not easily reduced to a cutaway chassis that could exempt a surface body except through extensive cutting of factory welds and sheet metals. Thus, it would be desirable to enable a truck or van body to be swapped or interchanged for an alternate configuration through a design that does not significantly penalize the cost, weight, packaging or performance of the base vehicle. Accordingly, it is desirable to provide a vehicle that enables an interchange of a commercial truck or van with an alternate configuration.

The cutaway or chassis cab provides a platform for different types of bodies to be added behind the factory cab. However, there is no reasonable ability to switch to an integrated van body with its optimized content for whose rear rows of seating, restraints and glazing for passenger visibility/comfort, sliding doors for efficient packaging and utility. By selecting an integrated cargo or passenger van body configuration precludes efficient changing to a cutaway/chassis cab configuration due to the integral structure in the base vehicle. This means that the base vehicle structure must be mechanically separated at permanently attached interfaces or panels must be at the desired interruption point to attach the new body. This risks environmental intrusions and corrosions at the interfaces and eliminates the possibility of going back to an integrated body configuration.

Accordingly, the present disclosure provides such features. The interface is not intended for frequent changeovers as designs that emphasize quick changes between bodies do so by sacrificing product costs and payloads. The present disclosure enables the ability to change a vehicle body from cargo/cabin to another with minimal comprise to vehicle performance metrics, cost and mass. The present disclosure provides a repeatable serviceable method of changing the configuration of the vehicle as the need of the owner may change over the extended service life of the pickup truck or commercial van. Also, the present disclosure prioritizes efficient designs in terms of body and integrity, noise vibration harshness, ceiling, low mass and space utilization over making rapid changeovers between configurations at high frequencies, daily or weekly.

The present disclosure provides a robust solution to create a serviceable interface between a vehicle cab and cargo body through a combination of features not previously identified. Thus, the present disclosure provides a cargo or passenger type body with variance that may include open air configurations like pickup trucks, flat, stake side or hybrid tool beds. Also, closed configurations including all passenger configurations, all cargo configurations in a continuous profile from the cab, and closed configurations that may be discontinuous from the cab profile such as box bodies or RV bodies may be utilized. Additionally, hybrids of extended passenger cabins (second row of seats) can be combined with different open and closed cargo configurations.

SUMMARY

This section provides a general summary of the disclosure, and is not a comprehensive disclosure of its full scope or all of its features.

According to a first aspect of the disclosure, an interchangeable body interface comprises a body interface includes a first ceiling zone with a channel to receive a seal. A cabin interface includes a second sealing zone with a channel to receive a second seal. A drain zone is located between the outer (first) and inner (second) seals. If water or foreign material is able to breach the first seal interface, the second seal will prevent entry to the interior cabin, allowing the drain zone to collect and route that water/material via the drain zone created between the seals, to a final drain location under the vehicle. A plurality of compensating fasteners couple the body and cab interfaces together. The compensating fasteners set a nominal gap between the body and cab interfaces to receive the seals. The first and second seals are compliant to static clearance and dimensional variations. The first seal reduces intrusion into the seal zone. The second seal retains liquid in the drain zone for evacuation from the vehicle. The plurality of component fasteners each include a bolt and nut. The nut has a desired thickness to set the gap between the body and cabin interfaces. The nut may include one or more bushings and a seat. The plurality of compensating fasteners are positioned between the first and second seal zones.

According to a second aspect of the disclosure, a vehicle with an interchangeable body comprises a cab and a body as well as an interface removably connecting the cab and the body. A body interface includes a first sealing zone with a channel to receive a seal. A cabin interface includes a second sealing zone with a channel to receive a second seal. A drain zone is located between the first and second sealing zones. The drain zone's purpose is to collect and route liquid and debris forced past the first seal and retained in the drain zone by the second seal. A plurality of compensating fasteners couple the body and cab interfaces together. The compensating fasteners set a nominal gap between the body and cab interfaces to receive the seals. The first and second seals are compliant to static clearance and dimensional variations. The first seal reduces intrusion into the seal zone and reduces wind noise. The second seal retains liquid to the drain zone. The plurality of compensating fasteners each include a bolt and nut. The compensating nut is engaged by the bolt's rotation and translates to a position where the supporting panel resists the pushing force. The bolt is then able to achieve its target torque and the distance between the panels is maintained by the torqued bolt. The plurality of compensating fasteners are positioned between the first and second seal zones. A second body may be substituted for the first body. The second body changes the functionality of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
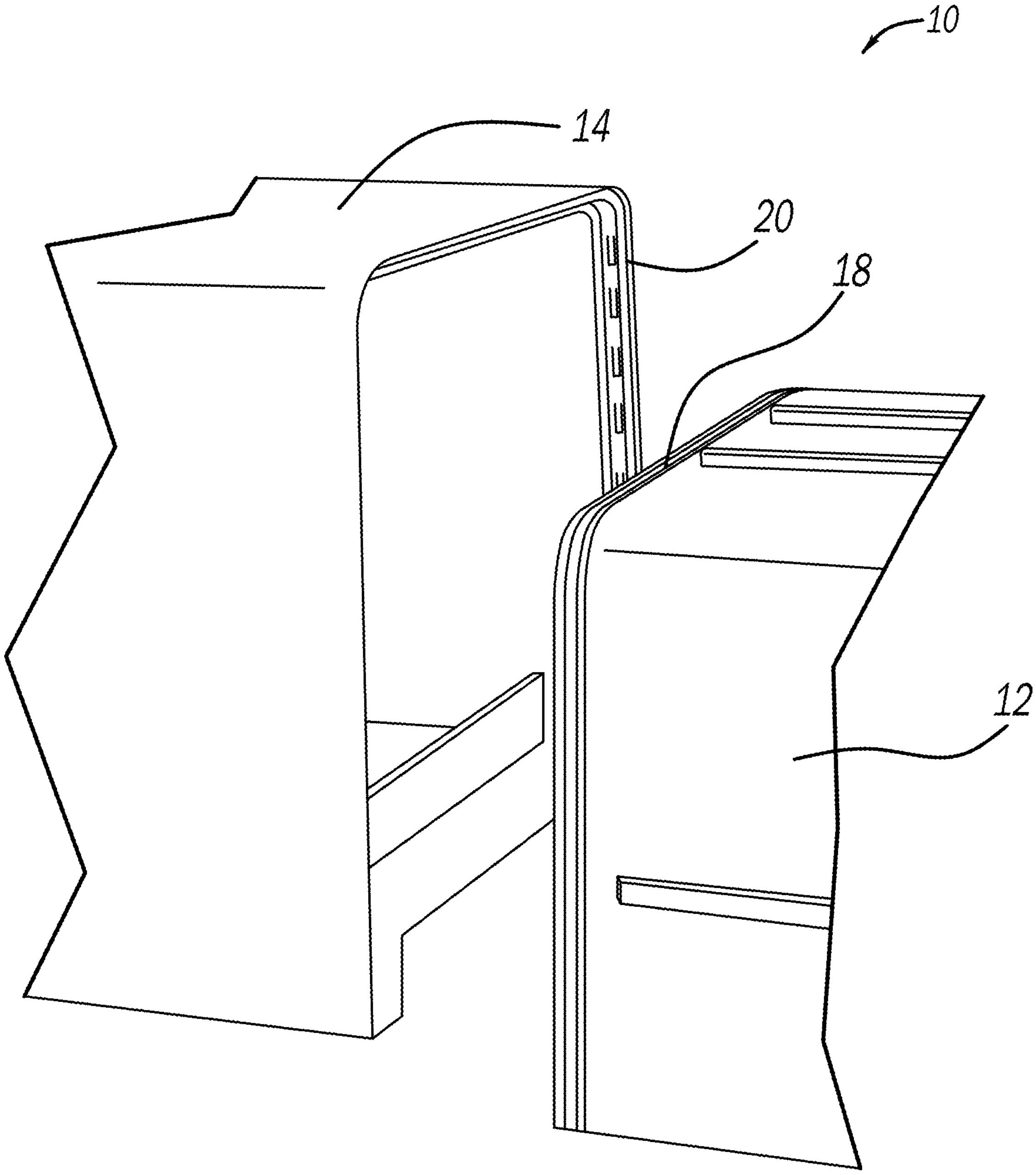
FIG. 1 is a perspective view of a vehicle body and cab with the interface.
Figure 2:
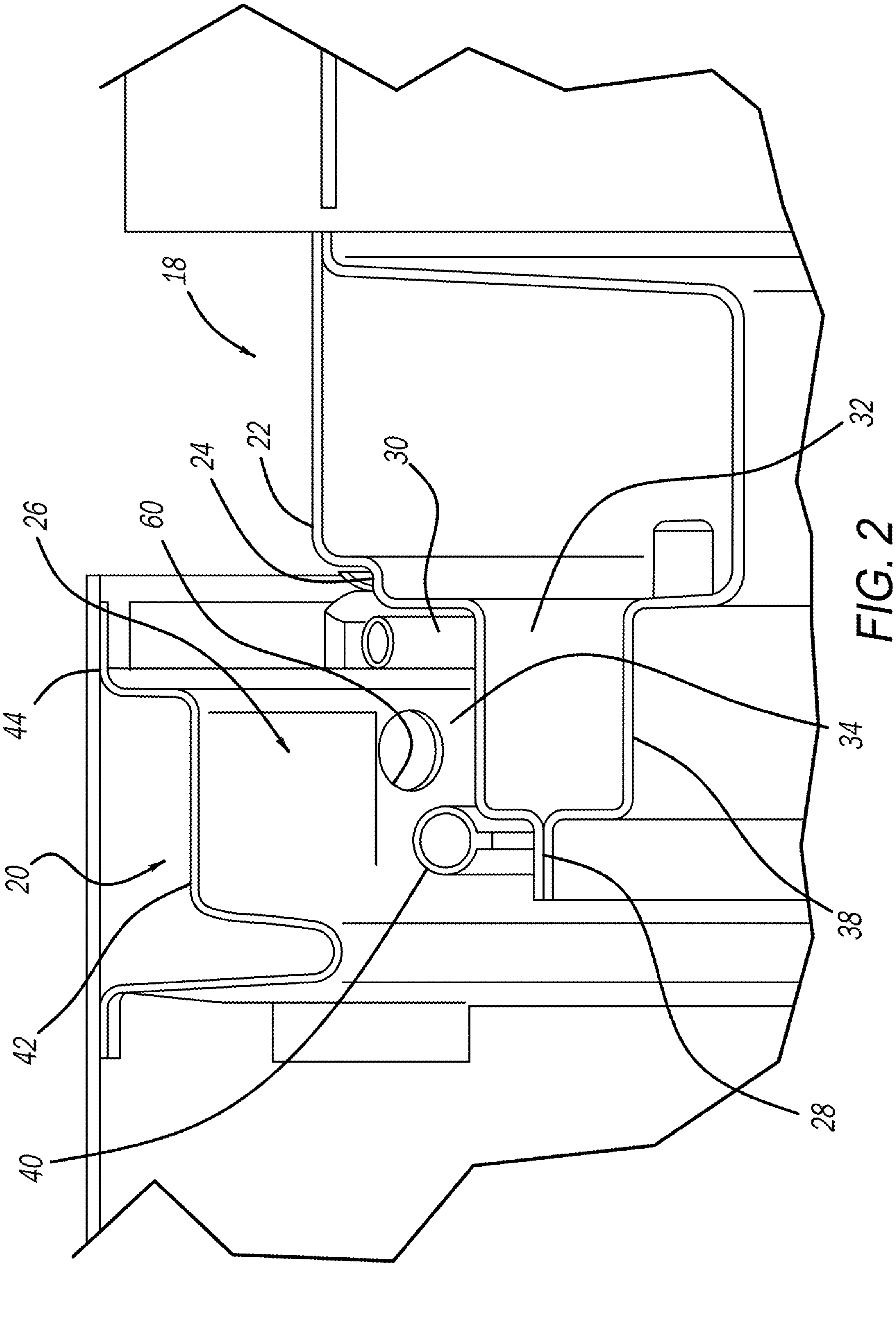
FIG. 2 is a cross-section view of the interface between the body and cab.

Example embodiments will now be described more fully with reference to the accompanying drawings.

Turning to the figures, a vehicle is illustrated and designated with the reference numeral 10. The vehicle includes a cab 12 and a body 14. The body may be of different variations to provide a plurality of bodies that are interchangeable with the cab 12. The body 14 can be of a cargo or passenger type. The cab 12 includes an interface 18. Likewise, the body 14 includes a body interface 20. The interfaces 18, 20 mesh together to provide a connection to couple the cab and body together for use as a vehicle.

Interface 18 includes a plurality of steps 22. The first step 24 provides a seal seat while the second step provides for a drain zone 26, which is the cavity between the seals, cab and rear body, and the third step 28 provides a flange. The first step 24 provides a seat to enable positioning of the exterior seal 30 which seals the vehicle 10 against intrusion of water/debris into the drain zone 26. The seal 30 is compliant to static clearance and dimensional variation. Additionally, the seal 30 reduces exterior wind noise entering the cabin.

The drain zone 26 includes a cavity 32 to receive the liquid water or debris that may pass by the seal 30. The drain zone 26 includes a bottom wall 34 that includes a plurality of apertures 36 that enable passage of the bolt. The cavity is surrounded by a bottom wall 34 that enables the debris or water to flow around the cab 12. The liquid/debris drainage occur by the slope of the drain zone 26 toward either side of the vehicle. The side walls of the drain zone include the 2 bubble seals, the top wall would be 42, and the bottom wall 34 which define cavity 32.

The flange 28 provides a seat for the interior seal 40. The interior seal 40 seats on the flange 28. The seal 40 is compliant to static clearance and dimensional variation. The seal 40 prevents intrusion of the water or debris into the passenger compartment. Also, the seal 40 reduces exterior/wind noise entering the cabin. A second wall 41 enhances the flange 28. The second wall includes an aperture 38 to enable passage of the compensating bolt 72.

Figure 3:
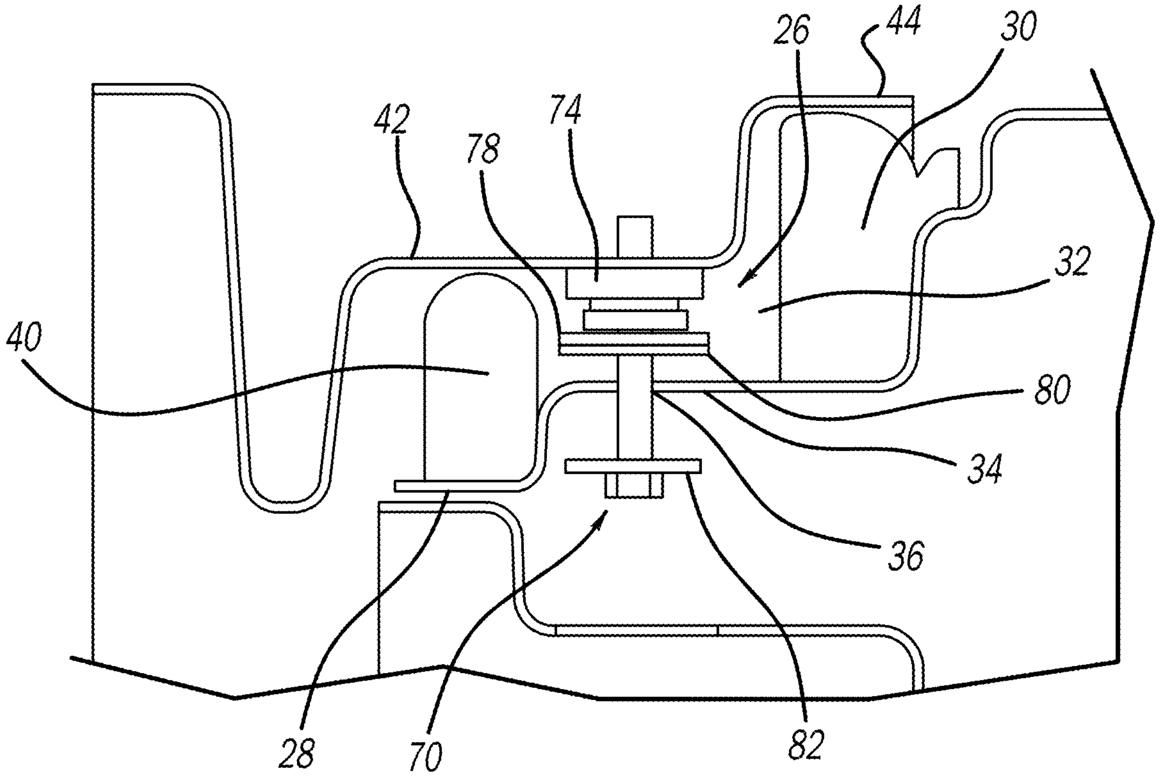
FIG. 3 is an enlarged cross-section view like FIG. 2.
Figure 4:
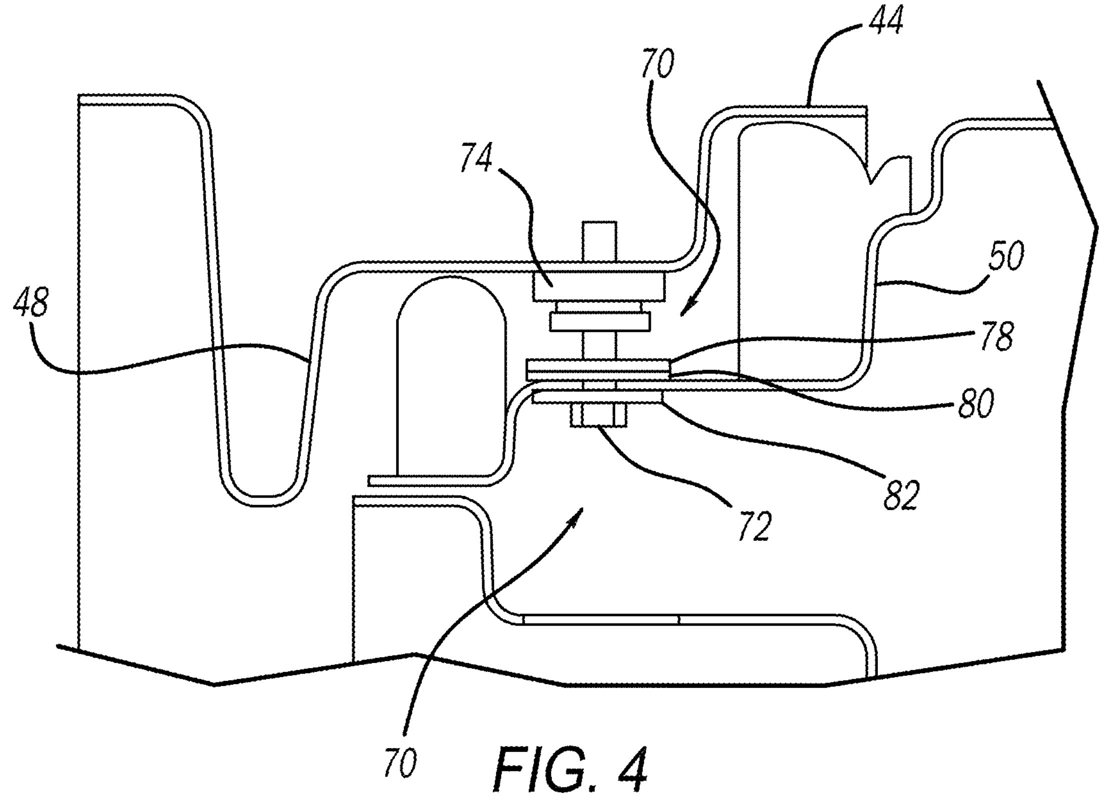
FIG. 4 is a view like FIG. 3.

The body interface 20 includes a plurality of step channels 42, 44 to receive the seals 40, 30. The channels provide spacing for the seals 40, 30 so that seals abuts against the inner wall of the channels 42, 44. Also, the channels are defined by a side wall 48, 50 that is circumferential around the interface to abut with the flange portion 28 and the drain portion 26 as seen in FIGS. 3 and 4. This closes off the seal channels to enhance the prevention of water from debris entering into the passenger compartment.

The channel wall 42 receives the first seal 40. Additionally, the drain zone wall 34 includes a plurality of apertures 36 to receive the tolerance or compensating fastener 70.

The compensating fastener includes a bolt 72 and a nut 74. The nut 74 is staked or welded to the wall 42 at the apertures 36 to enable passage of the bolt 72. The compensating nut assembly 74 includes a washer or spacer 78. The washer includes a seal 80 that is positioned adjacent the wall 34 so that the aperture 36 is sealed upon torquing of the bolt 72 into position as illustrated in FIG. 4. Also, the bolt 72 includes a washer 82 that abuts against the inside surface of the wall 34 during torquing of the nut 74 as illustrated in FIG. 4.

As illustrated in FIG. 3, the sealing washer 80 is away from the wall 34. This is before torquing of the bolt 72. Once the bolt 72 is torqued, as illustrated in FIG. 4, the seal 80 is against the wall 34 to provide sealing of the drain zone in the cavity 32. Thus, once the nut is torqued, the compensating tolerance nut provides spacing of the interference with respect to the walls 42 and 34 to provide the desired gap. Thus, the bolt 72 can pass through the nut 74 until the washer 82 contacts the wall 34 of the drain zone 26 so that the gap is provided for the seals 30 and 40. A plurality of fasteners 70 are positioned about the circumference and periphery of the interface to secure the cab 12 and body 14 with one another.

Alternatively, one or both seals may be replaced with a flexible bonding adhesive injected into the seal cavities in their assembled position. This configuration would reduce the number of tolerance compensating fasteners to establish the dimensional alignment of the body elements.

A cab or driver compartment—this is the base element for driver cabin and controls. It is typically configured with one row of seats for 1-3 occupants including the driver and may have some fore/aft offset of the driver position.

Two seals that maintain a designed sealing pressure between bodies to prevent environmental elements intruding into the vehicle cabin. These seals work together to allow static dimensional clearance and mating tolerances between the body and cab. The exterior facing seal may allow some penetration of environmental elements that will be stopped by the interior facing seal. These seals are responsible to prevent water intrusion and reduce the transmission of noise that is undesirable to the cabin occupants.

The fastener system is a serviceable clamping joint that is tolerant to manufacturing dimension tolerances of the mating body and cab, by properly loading the seals. The fastener system structurally integrates the body and cab at repeating points along the interface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An interchangeable body interface comprising:

a body interface including a first sealing zone having a channel for receiving a first seal;

a cab interface including a second sealing zone having a channel for receiving a second seal;

a drain zone adjacent the first and second sealing zones, the drain zone including a cavity for removing liquid forced past either the first and second seal zones; and a plurality of compensating fastener coupling the body and cab interfaces together, the compensating fasteners setting a nominal gap between the body and cab interfaces for receiving the seals.

2. The interchangeable body interface of claim 1 further comprising a first and second seal.

3. The interchangeable body interface of claim 2, wherein the first seal being compliant to static clearance and dimensional variation to prevent intrusion into the passenger compartment and reduce wind nose.

4. The interchangeable body interface of claim 2, wherein the second seal being compliant to static clearance and dimensional variation to retain intrusion of liquid into the drain zone.

5. The interchangeable body interface of claim 1, wherein the plurality of compensating fasteners each include a bolt and a nut assembly for setting the gap between the body and cab interfaces.

6. The interchangeable body interface of claim 1, wherein the plurality of compensating fasteners are positioned between the first and second seal zones.

7. A vehicle with an interchangeable body comprising:

a cab;

a body; and an interface removably connecting the cab and body;

a body interface including a first sealing zone having a channel for receiving a first seal;

a cab interface including a second sealing zone having a channel for receiving a second seal;

a drain zone between the first and second sealing zones, the drain zone including a cavity for removing liquid forced past the first and second sealing zones; and a plurality of compensating fastener coupling the body and cab interfaces together, the compensating fasteners setting a nominal gap between the body and cab interfaces for receiving the seals.

8. The vehicle of claim 7, further comprising a first and second seal.

9. The vehicle of claim 8, wherein the first seal being complaint to static clearance and dimensional variation to prevent penetration to the second seal and retain water in the drain zone.

10. The vehicle of claim 8, wherein the second seal being compliant to static clearance and dimensional variation to prevent or slow intrusion of liquid into the cabin/body.

11. The vehicle of claim 7, wherein the plurality of compensating fasteners each include a bolt and a nut assembly for setting the gap between the body and cab interfaces.

12. The vehicle of claim 7, wherein the plurality of compensating fasteners are positioned between the first and second seal zones.

13. The vehicle of claim 7, wherein substituting a second body for the first body.

14. The vehicle of claim 13, wherein the second body changes the functionality of the vehicle.

* * * * *